(12) United States Patent
Liu et al.

(10) Patent No.: US 7,866,553 B2
(45) Date of Patent: *Jan. 11, 2011

(54) IPOS TRANSACTION TERMINAL

(75) Inventors: Li Wen Liu, Fremont, CA (US);
Gamaethige Francis Robert Sulak Soysa, San Jose, CA (US); James C. Lungaro, San Jose, CA (US); Llavanya Fernando, San Jose, CA (US); Simon Lee, Fremont, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 90 days.

This patent is subject to a terminal disclaimer.

(21) Appl. No.: 12/138,515

(22) Filed: Jun. 13, 2008

(65) Prior Publication Data

US 2008/0249880 A1    Oct. 9, 2008

(51) Int. Cl.
*G06K 15/00* (2006.01)
(52) U.S. Cl. .................. 235/383; 235/379; 235/382; 235/385; 235/475; 705/14; 705/16; 705/39
(58) Field of Classification Search ............... 235/383, 235/379, 382, 385, 475; 705/14, 16, 39
See application file for complete search history.

(56) References Cited

U.S. PATENT DOCUMENTS

| | | | |
|---|---|---|---|
| 5,025,372 A | | 6/1991 | Burton et al. |
| 5,144,115 A | | 9/1992 | Yoshida |
| 5,380,958 A | * | 1/1995 | Protheroe et al. ........ 178/18.03 |
| 5,401,916 A | * | 3/1995 | Crooks .................... 178/18.03 |
| 5,493,315 A | * | 2/1996 | Atchley ..................... 345/547 |
| 5,561,282 A | * | 10/1996 | Price et al. ................. 235/380 |
| 5,642,485 A | | 6/1997 | Deaton et al. |

(Continued)

FOREIGN PATENT DOCUMENTS

EP    0474360    3/1992

OTHER PUBLICATIONS

Anonymous, "@pos.com Unveils Internet Initiative for Web-Enabling Retail Point-of0Sale", PR Newswire, Jun. 29, 1999.

(Continued)

*Primary Examiner*—Allyson N Trail (57) ABSTRACT

Apparatus and methods for transaction processing. The apparatus may be a transaction terminal including a keypad, a circuit for interacting with the transaction customer and a link communicatively connecting the keypad and the customer-interaction circuit. The cashier may interact with the keypad, while the customer (and not the cashier) may interact with the customer-interaction circuit. The link may communicate a dollar amount for the transaction between the keypad and the customer-interaction circuit. Accessories for the keypad may include a check reader, a display or a receipt printer. Accessories for the customer-interaction circuit may include a smart-card reader, a magnetic-strip reader and biometric readers. The customer-interaction circuit may include a port for connection to a remote service provider. That port may be the only remote-access port in the transaction terminal. The customer-interaction circuit may include a virtual keypad, and the circuit itself maybe programmed to capture a personal identifier number by means of that virtual keypad. The customer-interaction circuit may include virtual paper, and the circuit itself may be programmed to capture a signature by means of the virtual paper. A cash register at the POS location with the transaction terminal may not be communicatively coupled to the transaction terminal.

21 Claims, 5 Drawing Sheets

U.S. PATENT DOCUMENTS

| | | | |
|---|---|---|---|
| 5,739,512 | A | 4/1998 | Tognazzini |
| 5,761,650 | A | 6/1998 | Munsil et al. |
| 5,806,045 | A | 9/1998 | Biorge et al. |
| 5,910,988 | A | 6/1999 | Ballard |
| 6,009,411 | A | 12/1999 | Kepecs |
| 6,047,269 | A | 4/2000 | Biffar |
| 6,070,147 | A * | 5/2000 | Harms et al. ............. 705/14.25 |
| 6,076,068 | A * | 6/2000 | DeLapa et al. ............ 705/14.26 |
| 6,101,482 | A | 8/2000 | DiAngelo et al. |
| 6,233,682 | B1 | 5/2001 | Fritsch |
| 6,246,997 | B1 | 6/2001 | Cybul et al. |
| 6,249,773 | B1 | 6/2001 | Allard et al. |
| 6,341,353 | B1 | 1/2002 | Herman et al. |
| 6,415,261 | B1 | 7/2002 | Cybul et al. |
| 6,424,949 | B1 | 7/2002 | Deaton et al. |
| 6,431,439 | B1 * | 8/2002 | Suer et al. ................... 235/380 |
| 6,443,839 | B2 * | 9/2002 | Stockdale et al. ............. 463/16 |
| 6,456,981 | B1 * | 9/2002 | Dejaeger et al. ......... 705/14.38 |
| 6,540,137 | B1 * | 4/2003 | Forsythe et al. ............. 235/383 |
| 6,598,026 | B1 | 7/2003 | Ojha et al. |
| 6,609,106 | B1 | 8/2003 | Robertson |
| 6,611,814 | B1 | 8/2003 | Lee et al. |
| 7,407,095 | B1 | 8/2008 | Liu et al. |
| 2001/0020641 | A1 * | 9/2001 | Miyazawa et al. .......... 235/383 |
| 2002/0046082 | A1 * | 4/2002 | White ......................... 705/14 |
| 2002/0055875 | A1 * | 5/2002 | Schulze et al. ................ 705/14 |
| 2003/0018550 | A1 * | 1/2003 | Rotman et al. ................ 705/35 |
| 2003/0095646 | A1 * | 5/2003 | Paschini .................. 379/93.12 |
| 2003/0126020 | A1 * | 7/2003 | Smith et al. ................... 705/21 |

OTHER PUBLICATIONS

Bank, David, "Electronic Commerce Debuts on Internet", Austin American Statesman, Apr. 12, 1994.

Gage, Deborah, "Sun. Javawallet in pocket—Electronic wallet can organize, display transactions, credit data", Computer Reseller News, Aug. 26, 1996.

Goradia et al. "NetBill 1994 Prototype", Carnegie Mellon University, 1994.

* cited by examiner

IPOS TRANSACTION TERMINAL

BACKGROUND

This invention relates to point-of-sale (POS) systems and retail stores. More specifically, this invention relates to transaction terminals at POS locations in small retail stores.

Brick-and-mortar retailers may be divided into three classes based on the number of registers at a store. A tier-1 retailer may have, say, twenty-six (26) or more cash registers at one store. A tier-2 retailer may have 3 to 25 cash registers. Tier-3 retailers have one or two registers per store. (These tiers may overlap at their boundaries.)

The cash registers at the tier-1 and tier-2 stores, termed "electronic cash registers" or "ECRs," tend to be qualitatively different from the registers at tier-3 stores. A tier 1-tier 2 cash register may cost $5,000 or more. For its expense, an ECR is programmed or programmable to handle activities beyond that of a cash register. In an integrated POS system, an ECR may communicatively couple with a POS device such as a check reader or a magnetic-strip reader. The ECR has sufficient intelligence to control the POS device, say, to obtain credit- or debit-card information from the magnetic-strip reader, combine it with the transaction total that the ECR has computed and forward it all to an external payment processor for authentication and approval. The IBM ECR model 4690, available from International Business Machine Corporation, Armonk, N.Y., is an example of a prior-art ECR.

In comparison, the cash registers of tier-3 retailers are typically much less sophisticated. These cash registers cost about $500 to $800—significantly less than the tier 1-tier 2 ECRs. For their affordability, stand-beside cash registers are not able to control POS devices co-located with the cash register. Any magnetic-strip/POS reader located with such a tier-3 register, for example, itself possesses the intelligence to send card information to a remote payment processor for authorization.

Figure 1:
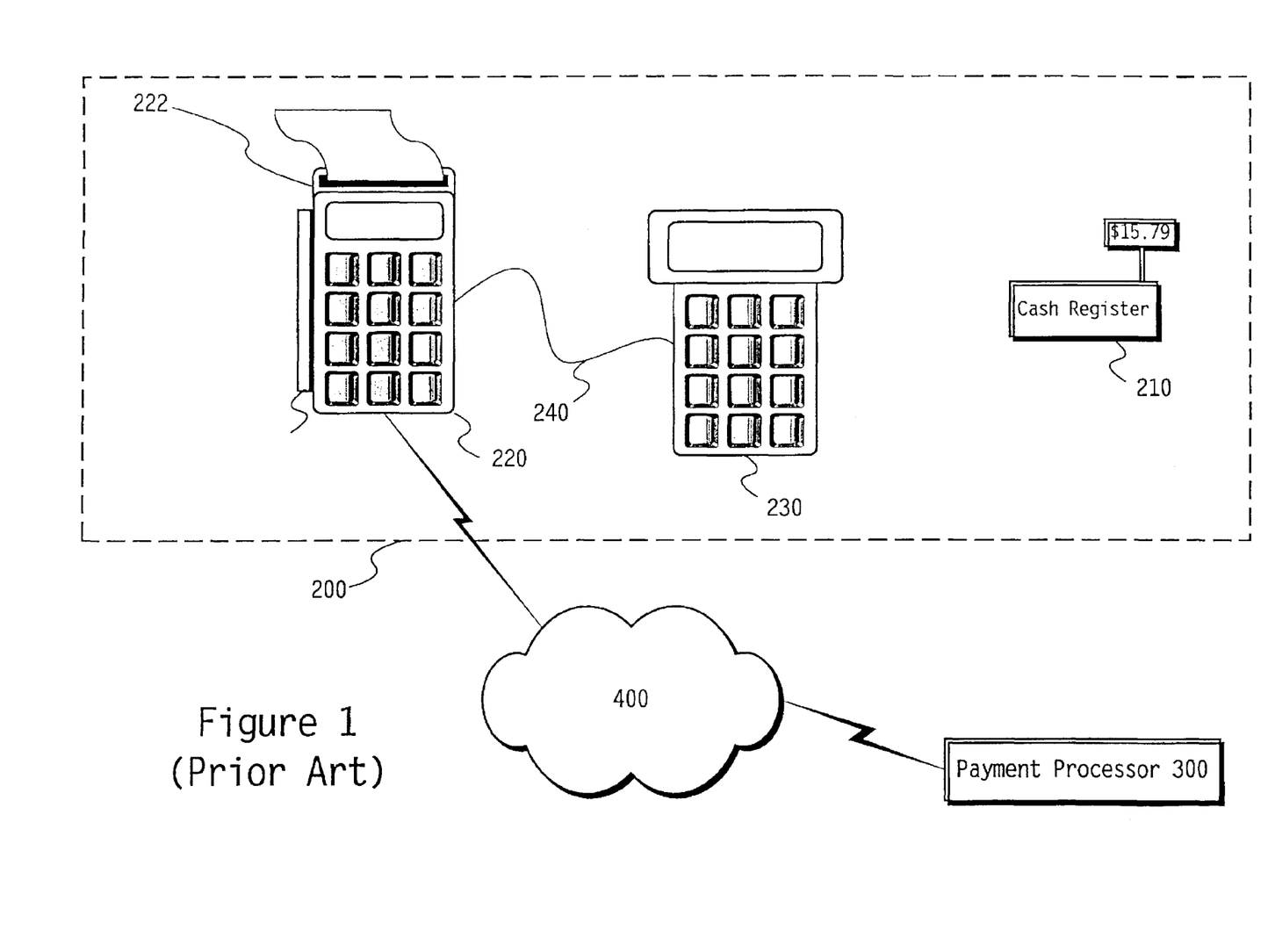
FIG. 1 illustrates a prior-art POS transaction environment for a tier-3 POS location.

FIG. 1 illustrates a prior-art POS transaction environment 200 for a tier-3 POS location. The POS transaction environment 200 includes a cash register 210, a payment-processing device 220 (optionally integrating a check/magnetic-strip reader 221 and a printer 222), a PIN pad 230 and a communications link 240. The link 240 communicatively connects the device 220 and the PIN pad 230.

In a retail system including the transaction environment 200 and a remote payment processor 300, a link 400 communicatively connects the transaction environment 200— through its device 220—to the payment processor 300. Notably, the cash register 210 and the payment-processing device 220 do not communicate.

The OMNI models 460 and 470, available from VeriFone, a division of Hewlett-Packard Company, Palo Alto, Calif., with their printer 900 and CR 600 check-reader options, are examples of prior-art payment processing devices 220. The OMNI 460 has automatic-payment-processing and receipt-printing capabilities. The OMNI 470 combines a payment terminal, a printer and a PIN pad. Both OMNI terminals can transfer data via modem. Eclipse-brand payment terminals convert paper checks into electronic items for instant funds transfer from a customer's account to the merchant's.

Hypercom, Inc., Phoenix, Ariz., makes T7 and T8 series of transaction terminals. The T7 series include a 35-key keyboard, LCD display, a card reader and a receipt printer.

IVI Checkmate, Roswell, Ga., makes an eN and Elite series of transaction terminals with PIN-pad and receipt-printer peripherals. Most of these terminals have direct-dial capability, integrated card readers and an LCD. Functions such as check reading, thermal receipt printing and wireless communication are optional.

In this tier-3 environment, processing a credit-card payment involves the cashier determining the dollar amount of the transaction using the cash register 210 and sliding the credit card through the check/magnetic-strip reader 221. The cashier then enters the transaction dollar amount into the device 220. The MSR 221 provides the requisite card information such as card number and expiration date. The device 220 then (dials and) communicates with the remote payment processor 300 to authorize the transaction. Upon authorization, the printer 222 prints a paper receipt which the customer then signs.

Processing a debit-card payment is similar: Instead of signing a paper receipt, the customer enters a PIN on the separate PIN pad.

Such a credit or debit transaction may take 6 to 22 seconds, depending on the type of connection with the remote payment processor. The customer idly waits for the transaction approval. Except for the entry of a PIN (if ever necessary, for a debit-card transaction, for example), the customer does not interact at all with the transaction system 200.

While such a setup allows the merchant to use credit- or debit-cards as payment for goods or services at a cost much less than with integrated ECRs, the setup obliges the retailer to forgo certain additional sources of revenue. For example, the intelligence of the payment-processing device is limited to communicating and authorizing transaction information.

Accordingly, the art seeks a tier-3 POS environment that is less costly than the tier-1 and tier-2 environments but nonetheless offers the opportunity to convert the idle times of the customer into potential revenue.

These and other goals of the invention will be readily apparent to one of skill in the art on reading the background above and the description below.

SUMMARY

Herein are described apparatus and methods for transaction processing. The apparatus may be a transaction system including a keypad, a circuit for interacting with a customer and a link communicatively connecting the keypad and the customer-interaction circuit.

The cashier may interact with the keypad, while the customer (and not the cashier) may interact with the customer-interaction circuit. The link may communicate a dollar amount for the transaction between the keypad and the customer-interaction circuit.

Accessories for the customer-interaction circuit may include a check reader, a receipt printer, a smart-card reader, a magnetic-strip reader and a biometric-information circuit.

The customer-interaction circuit may include a port for connection to a remote service provider. That port may be the only remote-access port in the transaction system.

The customer-interaction circuit may include a virtual PIN pad, and the circuit itself may be programmed to capture a personal identification number (PIN) by means of that virtual PIN pad. The customer-interaction circuit may include virtual paper, and the circuit itself may be programmed to capture a signature by means of the virtual paper.

A cash register at the point of sale with the transaction system may not be communicatively coupled to the transaction system.

A method for authorizing a transaction at a POS location may include engaging in a transaction at the POS location, thereby generating a dollar amount for the transaction. A transaction dollar amount is entered into a keypad and then communicated from the keypad to a customer-interaction circuit. Details of the transaction, including the dollar amount, are communicated to a remote service provider for authorization. During the step of entering and both steps of communicating, the customer-interaction circuit interacts with the customer. Between the steps of communicating, the transaction dollar amount maybe displayed on the customer-interaction circuit for the customer, and the customer may approve the transaction dollar amount.

DESCRIPTION OF SPECIFIC EMBODIMENTS

Figure 2:
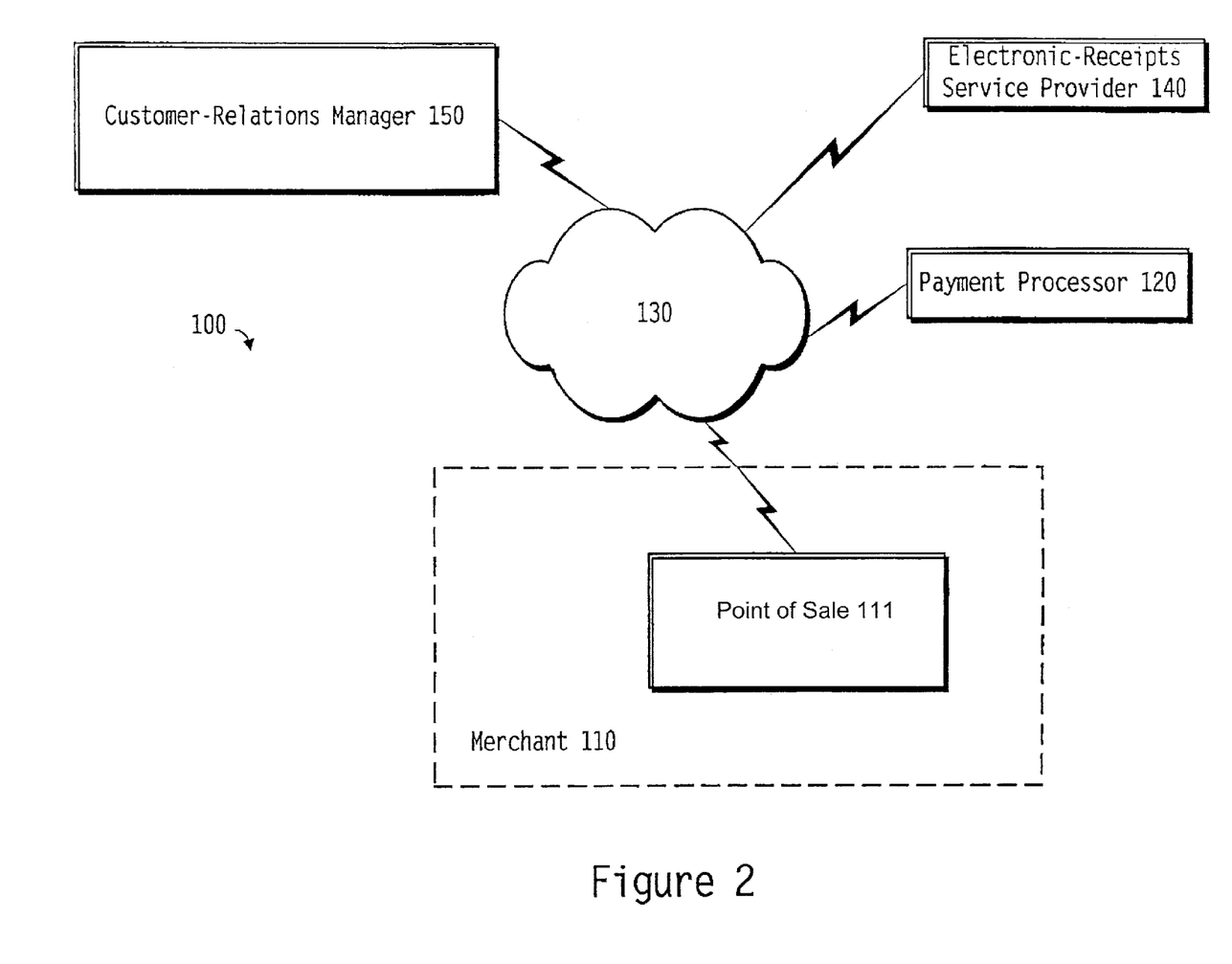
FIG. 2 illustrates a retail system incorporating an embodiment of the invention.

FIG. 2 illustrates a retail system 100 incorporating an embodiment of the invention. The retail system 100 includes one or more merchants 110, one or more remote payment processors 120, one or more application service providers (ASPs) such as the electronic-receipt service provider 140 or the customer-relations manager 150, and a communications link 130.

The link 130 communicatively couples the merchant 110 to the service providers 120, 140, 150. Where the link 130 is an internet, the merchants 110 and service providers 120, 140, 150 are each a node on the internet 130.

A merchant 110 may be a small retailer with, say, 1 or 2 cash registers. Example merchants 110 include convenience stores, restaurants, hospitality providers (barkeeps, innkeepers, etc.) and rental-car agencies.

A service provider 140 may provide an electronic-receipts repository for receiving and storing transaction records. The service provider may provide an electronic-receipts service for manipulating a transaction record—retrieving and forwarding it on demand, for example. The website www.Crossvue.com, made available by Crossvue.com, San Jose, Calif., is an example of an electronic-receipts service ASP 140.

The service providers 120 support the transactions of a merchant 110. An application service provider 120 (a payment processor or one of its affiliate banks, for example) may verify credit or debit cards or may authorize credit- or debit-card transactions.

The service-provider 150 may be an advertisement server. Doubleclick.com, New York, N.Y., is an example of a service provider 150. Indeed, the service provider 150 may serve up any content that a customer may find interesting or that may provide useful information. (For example, the lack of an (affirmative) customer response to an advertisement, promotion or survey is of itself an interesting response.)

Figure 4:
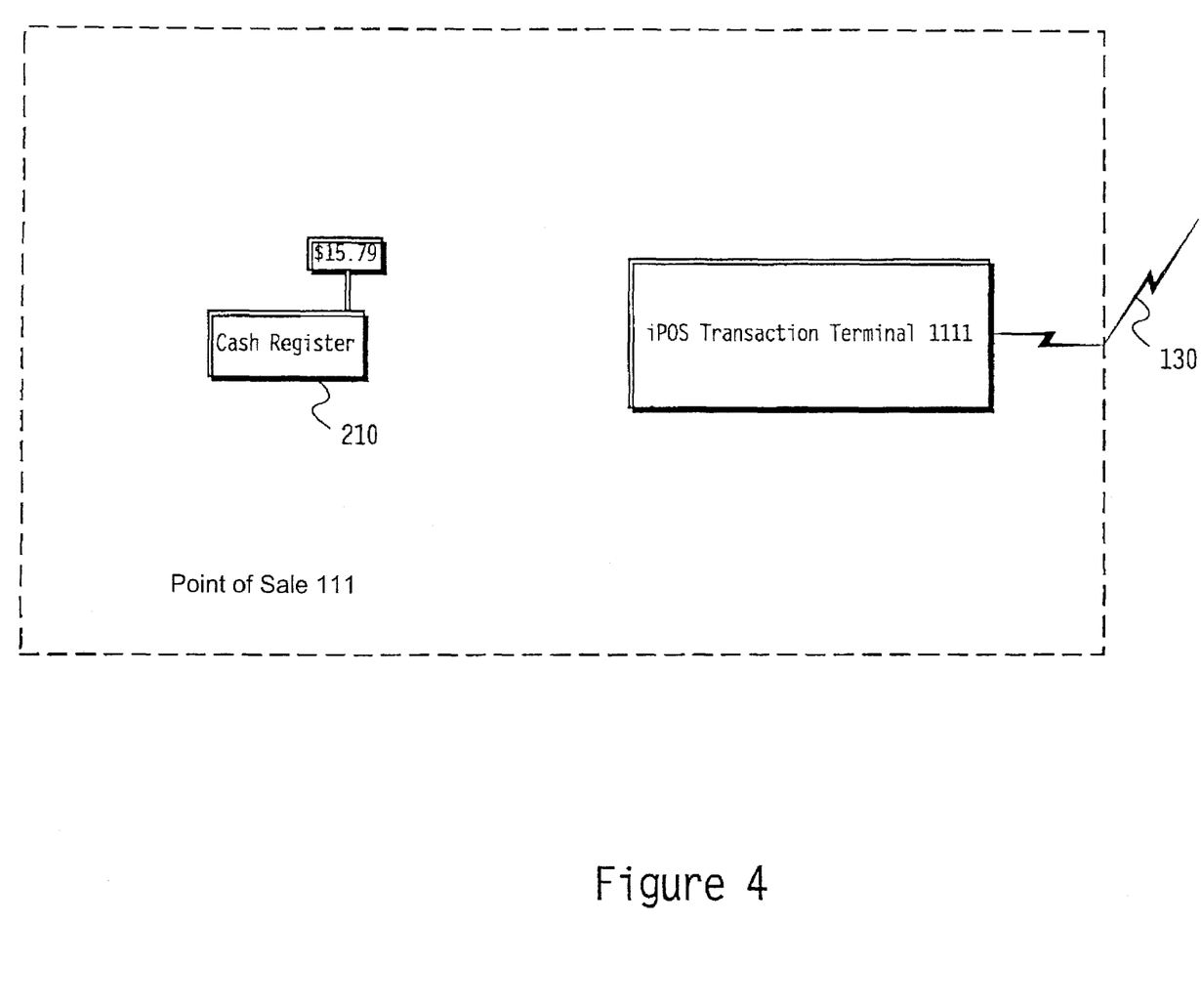
FIG. 4 illustrates a point of sale incorporating an embodiment of the invention.

The merchant 110 includes a point of sale (POS) 111 incorporating an embodiment of the invention. FIG. 4 illustrates that POS 111, including a cash register 210 and an iPOS transaction system 1111.

Figure 3:
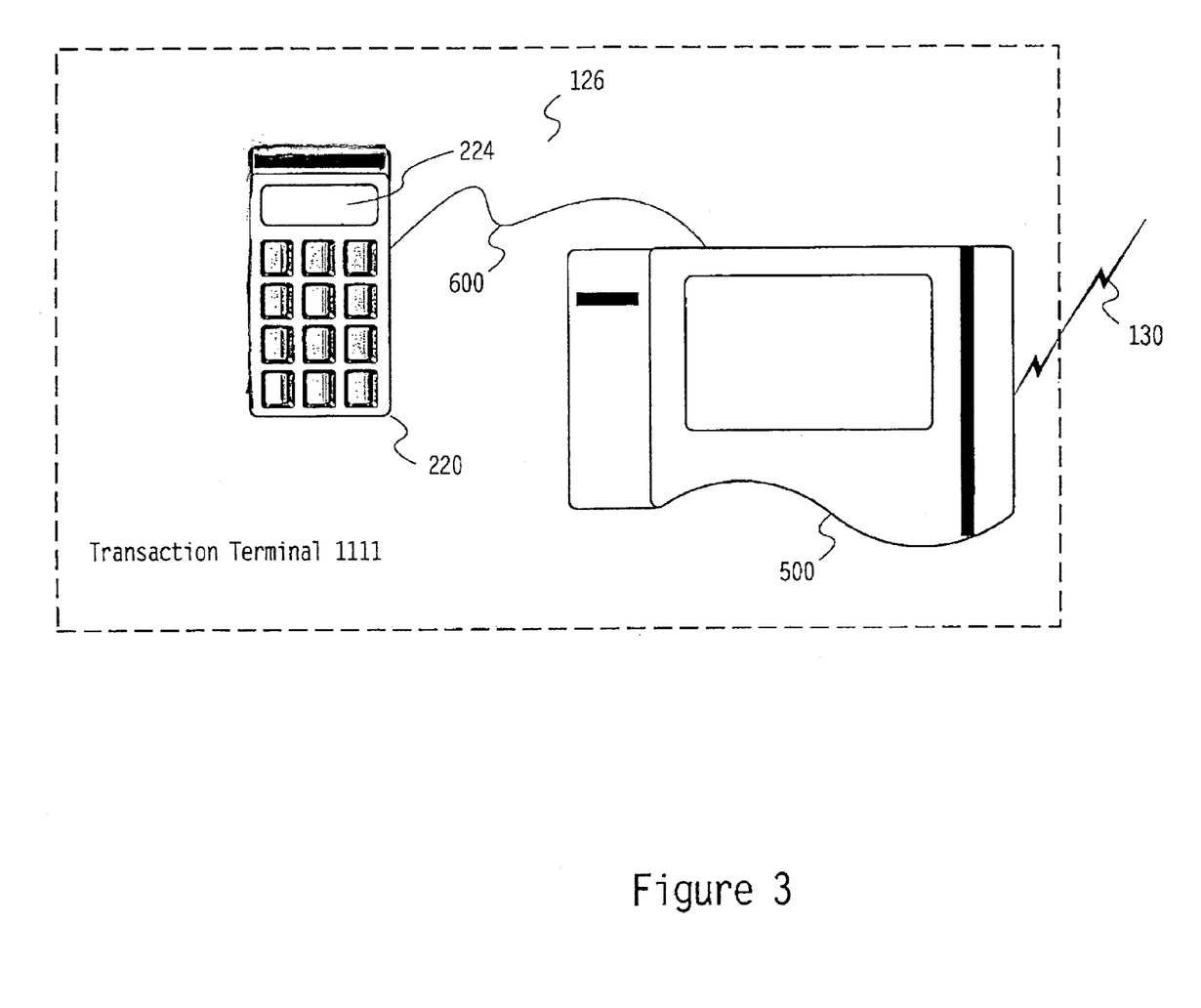
FIG. 3 illustrates the point-of-sale (POS) transaction system of FIG. 4, according to one embodiment of the invention.

FIG. 3 illustrates an interactive point-of-sale (iPOS) transaction system 1111 according to one embodiment of the invention. The iPOS transaction system 1111 may include a numerical keypad 220, a customer-response unit (CRU) 500 and a communications link 600. The link 600 communicatively couples the keypad 220 and the CRU 500.

The keypad 220 typically includes an LCD display 221. In use, the keypad 220 assists the cashier. The keypad 220 may receive from the cashier the dollar amount of a given transaction for debit- or credit-payment processing.

Figure 5:
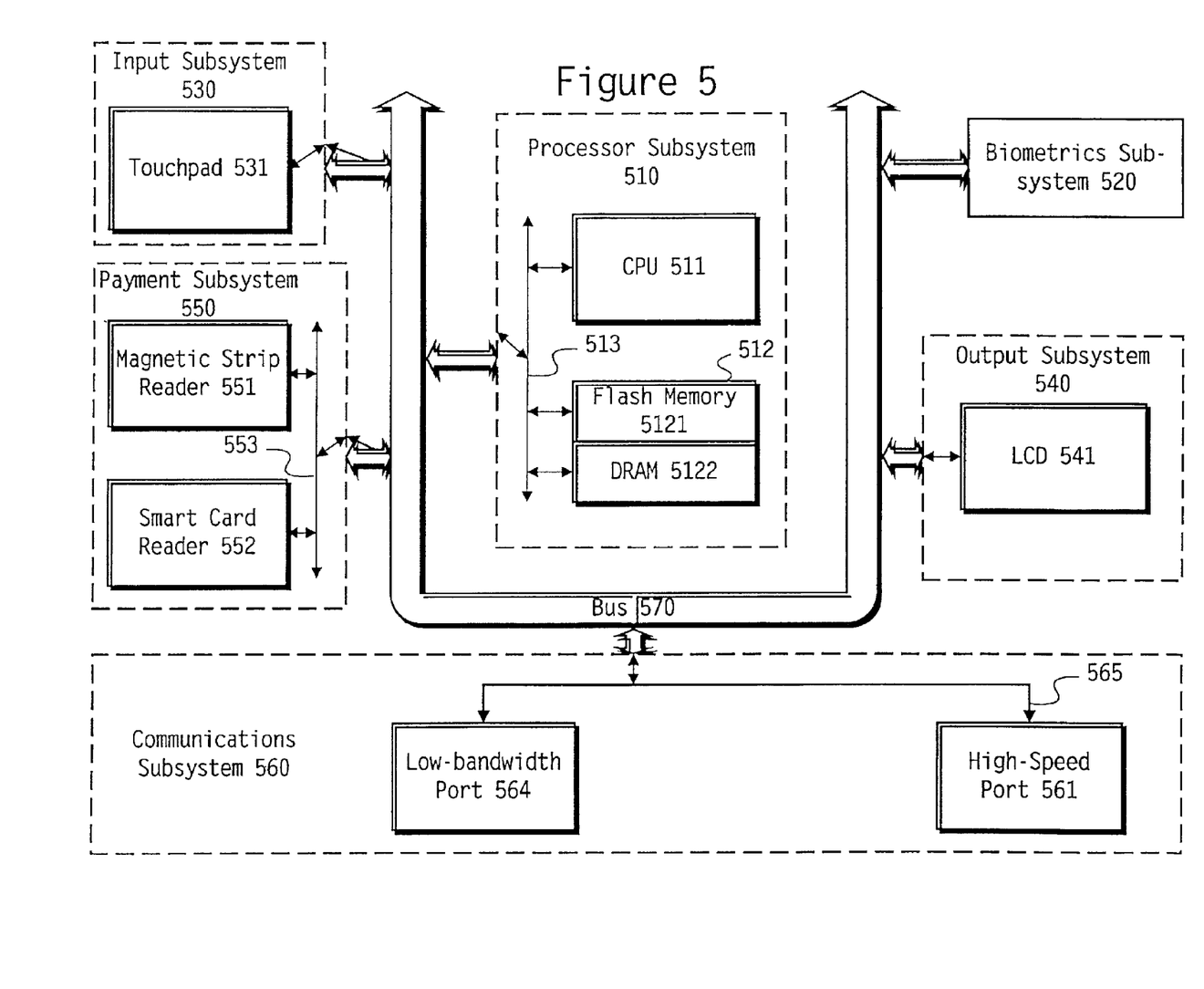
FIG. 5 schematically illustrates a customer-response unit, according to one embodiment of the invention.

The CRU 112 interacts with the customer to complete or enhance the transaction. FIG. 5 schematically illustrates a CRU 500, according to one embodiment of the invention. The CRU 500 may include a processor sub-system 510, a biometrics sub-system 520, an input sub-system 530, an output sub-system 540, a payment sub-system 550, a communications sub-system 560 and a bus 570. The bus 570 communicatively couples all of the biometrics, input, output, payment and communications sub-systems 520, 530, 540, 550, 560 to each other and to the processor sub-system 510.

The processor sub-system 510 includes a CPU 511, a memory 512 and a bus 513. The memory 512 includes random-access memory (RAM) 5122 and may include flash memory 5121. The bus 513 communicatively couples the CPU 511 and the memory 512 and may be wholly or partly integral with the bus 570.

The memory 512 includes software (not shown) controlling the CRU 500 according to its roles described herein. The memory 512 also contains drivers and other software as necessary to operate the input, output and payment sub-systems 530, 540, 550.

The biometrics sub-system 520 electronically captures biometric information such as fingerprints, retinal images or facial features.

The input sub-system 530 may include a touch pad 531, and the output sub-system 540 may include a display 541 that is preferably a color liquid crystal display (LCD). The touch pad 531 and the display 541 may combine to create a virtual PIN pad for numeric entry or virtual paper for electronic signature capture, as are known in the art.

The payment sub-system 550 may include a magnetic-strip reader 551, a smart-card processor 552 and a bus 553. The bus 553 may communicatively couple the magnetic-strip reader 551, the smart-card processor 552 and the bus 570. The bus 553 may be wholly or partly integral with the bus 570. (In one embodiment, the input system can also handle the other types of payment mentioned herein.)

The communications sub-system 560 includes a low-bandwidth port 564, a high-speed communications port 561 and a bus 565. The bus 565 communicatively couples the ports 564, 561 to the bus 570. The bus 565 may be wholly or partly integral with the bus 570.

The low-bandwidth port 564 is preferably serial, particularly an RS-232 or RS-485 port. The high-bandwidth port 564 is preferably a local or wide area network connection, such as the Internet over a digital subscriber loop or line (DSL).

In an example transaction, the cashier enters the dollar amount of the transaction, using the RCK 220. The cashier's data entry is typically asynchronous to the customer's activities. The cashier-side keypad 220 communicates this dollar-amount information to the CRU 112, using the link 113. The customer uses the CRU 112 to select a payment option. In response, the CRU 112 prepares to accept the selected payment method. The customer inserts his card, swipes his card or otherwise presents his payment method as determined by the chosen option. For debit cards, the customer enters a PIN using the virtual PIN pad of the CRU 112. The CRU 112 transfers the transaction total and other transaction information to the remote payment processor 120 and waits for an approval.

While the CRU 112 waits for the service provider 120 to authorize the transaction, the CRU 112 may communicate with the customer-relations manager 150 over the link 130 to receive content for display to the customer. The CRU 112 also may display transaction information (and card information, if applicable).

On approval of a credit transaction, the CRU 112 prompts for the customer's signature. The signature may be electronic.

The CRU 112 itself or the keypad 220 may print a receipt which the cashier may hand to the customer. The CRU 112 then may transmit a record of the transaction (and transaction details such as an electronic signature) to the electronic-receipts service 140.

The retail system 100 offers tier-3 retailers targeted-marketing opportunities at the point of sale while processing credit and debit transactions.

The numerous embodiments of the iPOS transaction terminal permit the small, tier-3 retailer to minimize cost by choosing an iPOS transaction system 1111 configured exactly for that small retailer's business. The retailer need not pay for functionality that it may never use.

Indeed, the invention now being fully described, many changes and modifications that can be made thereto without departing from the spirit or scope of the appended claims will be apparent to one of ordinary skill in the art.

This specification incorporates by reference all publications and patent applications mentioned herein, to the same extent if the specification had specifically and individually incorporated by reference each such individual publication or patent application.

What is claimed is:

1. A customer-response unit for communication with a cashier-side unit, the customer-response unit, comprising:
    an interface to a content-provider for receiving content for presentation, wherein the content is unrelated to data essential for completion of the transaction;
    a display for presenting the content, wherein the display includes an indication that a customer can respond to the content by interacting with the customer-response unit; and
    a customer interface for receiving customer input and a customer response to the content, the customer-response unit determining whether the response to the content are received, the response being transmitted to an advertisement server in order to collect information about the customer when the response is received, the customer-response unit generating a non-response and transmitting the non-response to the advertisement server to collect information about the customer when the response is absent.

2. A customer-response unit according to claim 1, wherein the content for presentation comprises an advertisement, coupon, or award.

3. A customer-response unit according to claim 1, wherein the customer input comprises a signature.

4. A customer-response unit according to claim 1, wherein the customer input comprises a personal identification number (PIN).

5. A customer-response unit according to claim 1, wherein the customer input comprises a biometric data.

6. A method, comprising:
    presenting content to a customer via a customer-response unit;
    if the customer enters a response to the content via the customer-response unit, transmitting the response to an advertising server; and
    if the customer does not respond to the content, generating a non-response and transmitting the non-response to the advertisement server.

7. A method according to claim 6, wherein the content comprises an advertisement, coupon, or award.

8. A method according to claim 6, further comprising:
    receiving from the customer an input relating to a transaction, wherein the content is unrelated to data essential for completion of the transaction.

9. A method according to claim 8, wherein the customer input comprises an electronic signature.

10. A method according to claim 8, wherein the customer input comprises a personal identification number (PIN).

11. A method according to claim 8, wherein the customer input comprises a biometric data.

12. A method according to claim 8, further comprising:
    communicating a monetary amount of the transaction to the customer-response unit.

13. A method according to claim 8, further comprising:
    transmitting the customer input and the monetary amount to a remote service provider for authorization.

14. A system, comprising:
    means for presenting a content to a customer;
    means for, if the customer enters a response to the content via the customer-response unit, transmitting the response to an advertising server; and
    means for, if the customer does not respond to the content, generating a non-response and transmitting the non-response to the advertisement server.

15. A system according to claim 14, wherein the content comprises an advertisement, coupon, or award.

16. A system according to claim 14, further comprising:
    means for receiving from the customer an input relating to a transaction, wherein the content is unrelated to data essential for completion of the transaction.

17. A system according to claim 16, wherein the customer input comprises an electronic signature.

18. A system according to claim 16, wherein the customer input comprises a personal identification number (PIN).

19. A system according to claim 16, wherein the customer input comprises a biometric data.

20. A system according to claim 16, further comprising:
    means for communicating a monetary amount of the transaction to the customer-response unit.

21. A system according to claim 16, further comprising:
    means for transmitting the customer input and the monetary amount to a remote service provider for authorization.

* * * * *

UNITED STATES PATENT AND TRADEMARK OFFICE
CERTIFICATE OF CORRECTION

Page 1 of 1

PATENT NO. : 7,866,553 B2
APPLICATION NO. : 12/138515
DATED : January 11, 2011
INVENTOR(S) : Liu et al.

It is certified that error appears in the above-identified patent and that said Letters Patent is hereby corrected as shown below:

On the Title Page, in Field (54), and in the Specifications, Column 1, Line 1, in Title, delete "TERMINAL" and insert -- SYSTEM --, therefor.

In the Drawings:

In Fig. 3, Sheet 3 of 5, delete "Transaction Terminal 1111" and insert -- iPOS Transaction System 1111 --, therefor.

In Fig. 4, Sheet 4 of 5, delete "iPOS Transaction Terminal 1111" and insert -- iPOS Transaction System 1111 --, therefor.

In Fig. 5, Sheet 5 of 5, insert --  --, above the figure.

Signed and Sealed this
Sixteenth Day of April, 2013

Teresa Stanek Rea
*Acting Director of the United States Patent and Trademark Office*